United States Patent
Stone et al.

(10) Patent No.: US 6,910,529 B2
(45) Date of Patent: Jun. 28, 2005

(54) VEHICLE ROOFTOP ENGINE COOLING SYSTEM

(75) Inventors: Kevin Thomas Stone, San Diego, CA (US); Juergen Schulte, San Diego, CA (US)

(73) Assignee: ISE Corporation, San Diego, CA (US)

( * ) Notice: Subject to any disclaimer, the term of this patent is extended or adjusted under 35 U.S.C. 154(b) by 0 days.

(21) Appl. No.: 10/339,735

(22) Filed: Jan. 8, 2003

(65) Prior Publication Data

US 2004/0129407 A1 Jul. 8, 2004

(51) Int. Cl.[7] .............................. B60K 11/04; B60H 1/00
(52) U.S. Cl. ........................... 165/299; 165/41; 165/51; 165/122; 165/95; 123/41.49; 123/142.5 R; 219/208
(58) Field of Search ................. 165/41, 44, 54, 165/122, 95, 51, 299; 123/41.49, 142.5 R; 62/244; 219/208

(56) References Cited

U.S. PATENT DOCUMENTS

| 1,754,257 | A | * | 4/1930 | Britt |
| 1,921,588 | A | * | 8/1933 | Simmon |
| 1,934,193 | A | * | 11/1933 | Hynes |
| 1,944,256 | A | * | 1/1934 | Miller et al. |
| 2,132,450 | A | * | 10/1938 | Wolf |
| RE27,632 | E | * | 5/1973 | Plackett ................. 237/12.3 A |
| 3,737,934 | A | * | 6/1973 | Skweres |
| 3,882,951 | A | | 5/1975 | Conley ......................... 180/64 |
| 3,934,644 | A | * | 1/1976 | Johnston |
| 4,413,596 | A | | 11/1983 | Hirayama ................... 123/41.1 |
| 4,757,858 | A | | 7/1988 | Miller et al. .................. 165/41 |
| 4,759,316 | A | | 7/1988 | Itakura .................... 123/41.08 |
| 4,958,681 | A | * | 9/1990 | Kadle .......................... 165/151 |
| 4,962,734 | A | * | 10/1990 | Jorgensen ................ 123/41.49 |
| 5,036,803 | A | | 8/1991 | Nolting et al. ............. 123/41.1 |
| 5,669,311 | A | * | 9/1997 | Hill et al. ................... 105/62.2 |
| 5,730,089 | A | | 3/1998 | Morikawa et al. ........ 123/41.14 |
| 5,826,549 | A | | 10/1998 | Martin ..................... 123/41.11 |
| 5,924,478 | A | * | 7/1999 | Crocker |
| 6,435,295 | B1 | | 8/2002 | Weigele et al. ............. 180/68.4 |
| 6,481,387 | B1 | | 11/2002 | Sano ......................... 123/41.1 |
| 6,483,423 | B1 | | 11/2002 | Han ........................... 340/3.1 |

FOREIGN PATENT DOCUMENTS

| DE | 2424929 | * | 12/1974 |
| DE | 3916692 A1 | * | 11/1990 |
| JP | 9-207586 | * | 8/1997 |

* cited by examiner

Primary Examiner—John K. Ford
(74) Attorney, Agent, or Firm—Stephen C. Beuerle; Procopio Cory Hargreaves & Savitch LLP

(57) ABSTRACT

A horizontal rooftop engine cooling system includes one or more radiator units horizontally mountable to the rooftop of a bus and including a radiator interconnected to one or more passages of an engine of the bus to allow coolant to flow between the engine and the rooftop cooling system to cool the engine. The cooling system can incorporate a fan mounting shroud, a ram-air aerodynamic shroud, and/or an ornamental aesthetic appearance shroud.

8 Claims, 2 Drawing Sheets

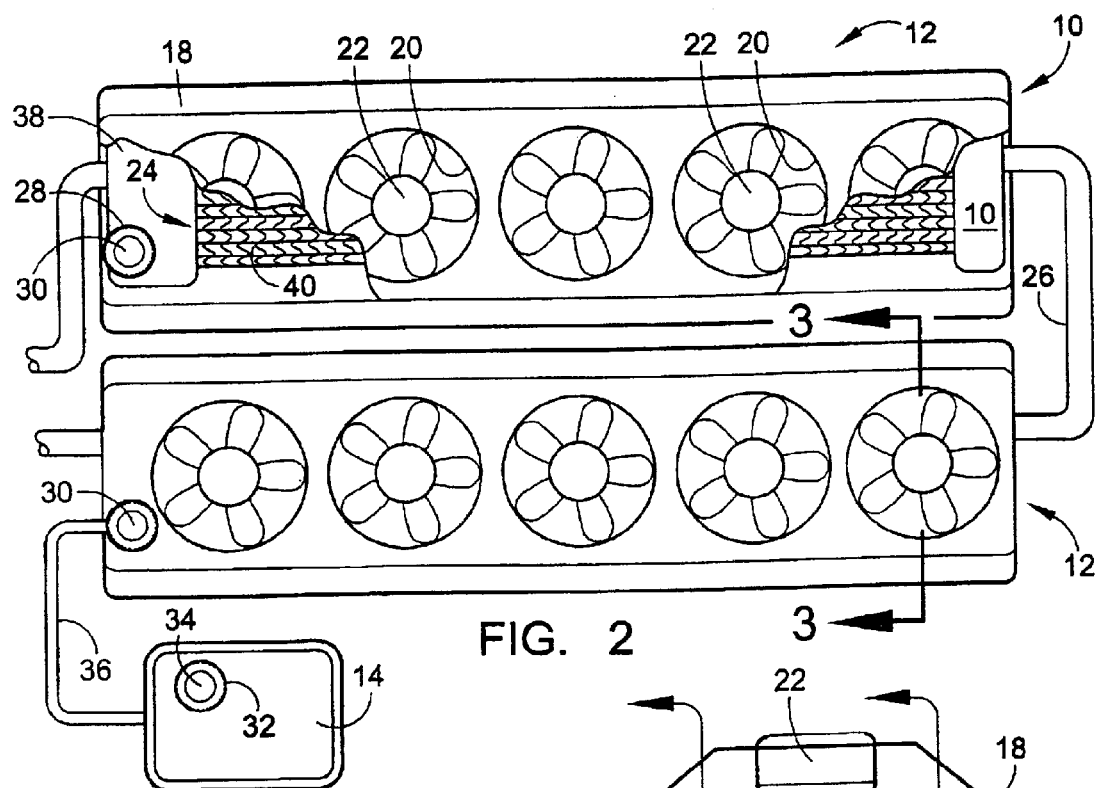
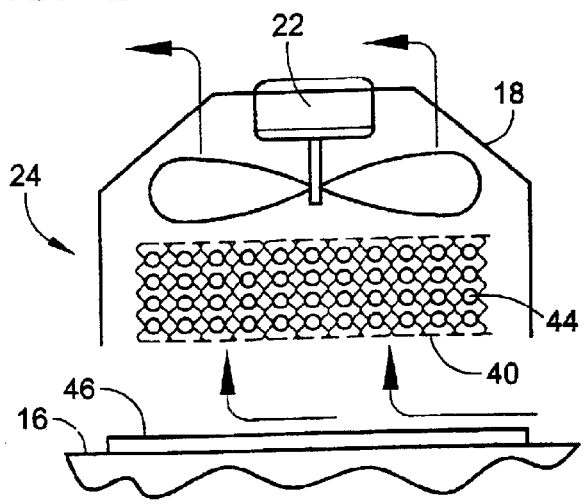
FIG. 2
FIG. 3

VEHICLE ROOFTOP ENGINE COOLING SYSTEM

FIELD OF THE INVENTION

The field of the invention relates, in general, to systems and methods for cooling motor vehicle engines, and, in particular, to systems and methods for cooling motor vehicle engines of buses.

BACKGROUND OF THE INVENTION

Some type of radiator or heat exchanger is normally required to remove heat from an internal combustion engine. For most applications, the power required to turn the fan that moves air through the radiator has been obtained through some mechanical, hydraulic, or belt-driven connection to the engine crankshaft.

A conventional radiator includes an intake tank, a core made up of a plurality of finned tubes, and an exit tank connected by hoses. The radiator may be used to cool the means of propulsion (e.g., gas engine, diesel engine, fuel cell engine) in the motor vehicle. The radiator may be filled with a coolant to radiate superfluous heat from the engine into the air by means of conduction and convection. Fans, which may be powered by the vehicle engine or electrically powered, propel ambient air near the surface of the road through the radiator core to accelerate the cooling process. The radiator is typically placed in a vertical orientation in close proximity to the vehicle engine in a tight, confined engine compartment. The fan draws the air through the radiator core area and directs it around the confined engine compartment. The ambient air passing through the radiator is heated and passes over the engine, tightly enclosed within the engine compartment. The air then is forced downward, under the vehicle. The location of the radiator often makes it difficult to perform maintenance on the engine. In some cases, the radiator shroud or the complete radiator must be removed to perform certain tasks.

Large vehicles such as buses, motor homes, and delivery vans have limited frontal access to the engine compartment that is often partially or completely blocked by the radiator of the vehicle. This can make maintenance on the engine or other engine compartment components very difficult. Standard bus radiator installations are close to the street level, typically on the street side of the bus. This low mounting location increases the dirt and debris collected by the radiator, and, hence, increases the number of times the radiator needs to be cleaned and checked, and decreases the cleaning intervals. Radiator cleaning requirements stipulate that the radiator be cleaned in the opposite direction of the airflow. Therefore, most radiators need to be cleaned from the inside of the engine compartment. This may require partial disassembly of the radiator shroud to effectively clean the radiator, increasing the time and complexity of the radiator cleaning process.

SUMMARY OF THE INVENTION

Accordingly, an aspect of the invention relates to a new and unique vehicle rooftop engine cooling system that improves the efficiency of present engine cooling systems used on buses. The engine cooling system includes one or more radiator units that are preferably horizontally oriented on the rooftop of a bus. Interconnected tubing connects the engine in the engine compartment to the one or more radiator units on the rooftop of a vehicle.

Horizontally orienting the one or more radiator units on the rooftop of a vehicle reduces the power load of the radiator fans on the internal combustion engine and/or battery. The horizontal rooftop engine cooling system may include electrically driven, thermostatically controlled fans to assist in cooling the rooftop engine cooling system. The large surface area of the roof top of the bus significantly reduces the fan power requirement by more than a factor of ten compared to a standard radiator in an engine compartment. Standard bus radiators/intercoolers consume up to 50 HP of engine power to drive the radiator cooling fan alone. The electrically driven radiator fans used with the horizontal rooftop engine cooling system consume less than 3 HP of engine power for equivalent cooling. The larger surface area of the roof top reduces the required airspeed through the radiator units and the required air pressure drop across the radiator units, thus, increasing the cooling system efficiency of the radiator units.

The horizontal rooftop engine cooling system also allows for natural convection air current to rise through the radiator units in an unconfined area. With the radiator unconfined on the rooftop of the vehicle, and with less demanding size limitations, the heat may be dissipated in a natural upward direction, minimizing the use of the electrically driven, thermostatically controlled fans. Consequently, the load of the electrically driven, thermostatically controlled fans is far less than that of fans of a standard radiator located in the engine compartment of a vehicle or even hydraulically powered fans mounted vertically on the rooftop.

A further benefit of locating the cooling system horizontally on the rooftop of the vehicle is that some of the cleanest and coolest air is available at the altitude of the rooftop, reducing the number of times the radiator needs to be serviced and increasing the duration between radiator cleanings. Because radiator cleaning requirements stipulate that the radiator be cleaned in the opposite direction of the airflow, the cooling system can be cleaned by simply spraying water through the fan orifices and shroud openings from outside of the cooling system. This type of cleaning would occur each time the bus passes through a normal bus wash cycle without any component disassembly. This is much simpler and less time-consuming than cleaning a radiator from the inside of the engine compartment, which may require partial disassembly of the radiator shroud to effectively clean the radiator.

Another aspect of the invention involves a method of using an engine cooling system with a bus including a rooftop and an engine in an engine compartment for propelling the bus. The engine includes one or more passages for allowing coolant to flow there through for cooling the engine. The method includes providing a horizontal rooftop engine cooling system including one or more radiator units having a radiator through which coolant fluid flows for removing heat from the radiator; horizontally locating the rooftop engine cooling system on the rooftop of the bus; and interconnecting the one or more radiator units of the rooftop engine cooling system to the one or more passages of the engine to allow coolant to flow between the engine and the rooftop cooling system to cool the engine.

A further aspect of the invention involves a horizontal rooftop engine cooling system for use on a rooftop of a bus including an engine in an engine compartment for propelling the bus. The engine includes one or more passages for allowing coolant to flow there through for cooling the engine. The horizontal rooftop engine cooling system includes one or more radiator units horizontally mountable to the rooftop of the bus. The one or more radiator units include a horizontal mounting frame to be horizontally mounted to the rooftop of the bus, a radiator carried by the mounting frame through which coolant fluid flows for removing heat from the radiator, and a shroud housed over the radiator. The radiator is interconnected to the one or more passages of the engine to allow coolant to flow between the engine and the rooftop cooling system to cool the engine.

A still further aspect of the invention involves a horizontal rooftop engine cooling system including one or more radiator units horizontally mountable to the rooftop of a bus. The one or more radiator units are horizontally mountable to the rooftop of the bus and include a radiator interconnected to the one or more passages of the engine to allow coolant to flow between the engine and the rooftop cooling system to cool the engine.

BRIEF DESCRIPTION OF THE DRAWINGS

The accompanying drawings, which are incorporated in and form a part of this specification, illustrate embodiments of the invention and together with the description, serve to explain the principles of this invention.

FIG. 2 is a top plan view of the horizontal rooftop engine cooling system illustrated in FIG. 1 with the optional overflow tank and portions of a fan mounting shroud broken away to reveal a radiator intake tank, a radiator core, and an exit tank.

FIG. 3 is a cross-sectional view of the horizontal rooftop engine cooling system of FIG. 1 taken along lines 3—3 of FIG. 1 and shows a radiator of one of the radiator units in a horizontal position.

DETAILED DESCRIPTION OF PREFERRED EMBODIMENTS

Figure 1:
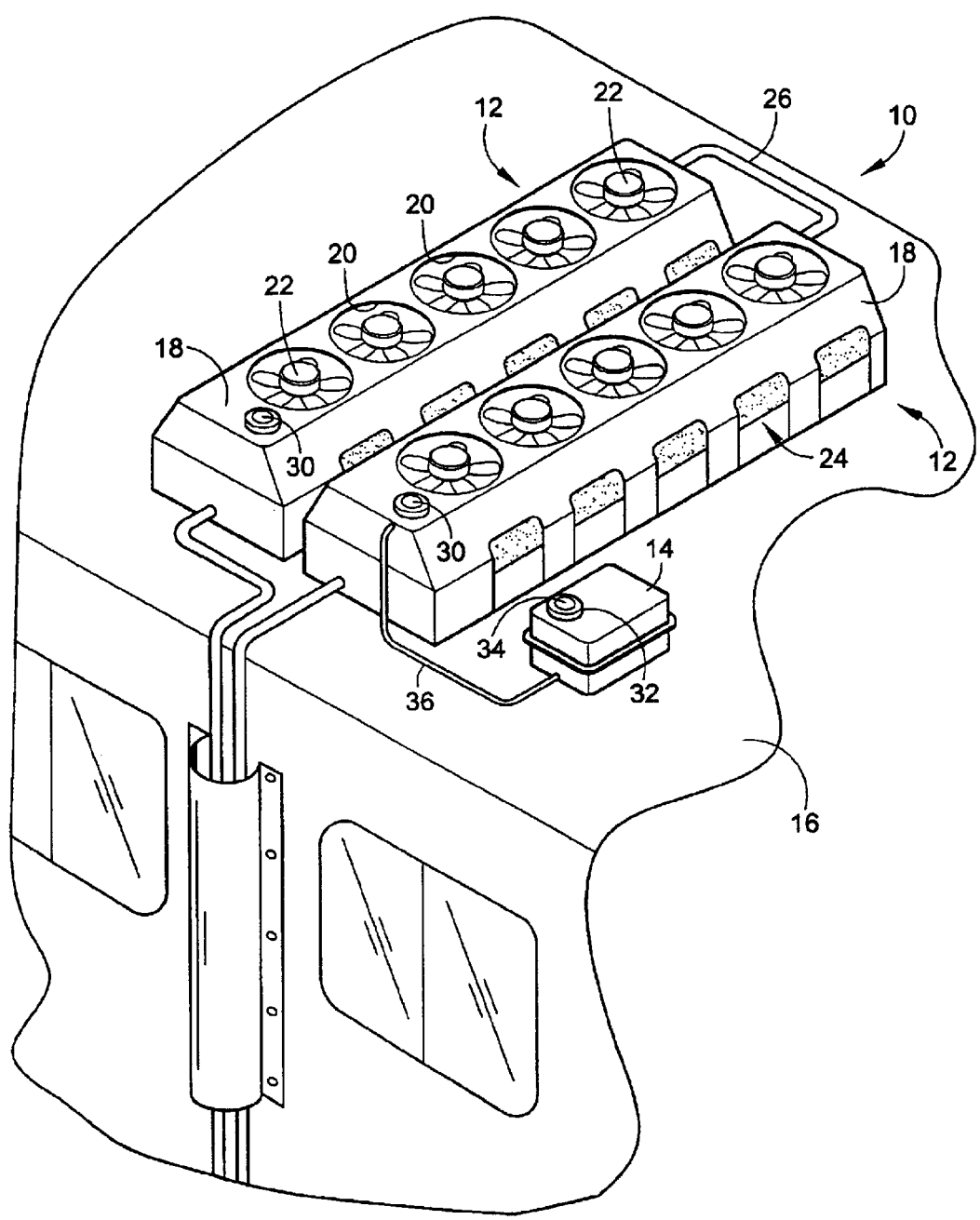
FIG. 1 depicts a perspective view of an embodiment of a horizontal rooftop engine cooling system with two radiator units, fan mounting shrouds, and an optional overflow tank all mounted perpendicular to the direction of vehicle travel. Alternatively, the cooling system may be mounted parallel to the direction of vehicle travel.

With reference to FIG. 1, an embodiment of a horizontal rooftop engine cooling system 10 will be described. The horizontal rooftop engine cooling system 10 is preferably implemented on a rooftop 11 of a bus; however, it should be fully understood that the rooftop engine cooling system 10 may be applied to the rooftop of any vehicle propelled by a propulsion system requiring cooling. Further, the rooftop engine cooling system 10 may be incorporated into new vehicles or may be a retrofitted onto existing vehicles.

The rooftop engine cooling system 10 may include one or more horizontal radiator units 12 and an optional overflow tank 14 located on the rooftop 11 of a vehicle 16. Each horizontal radiator unit 12 may include one or more types of shrouds 18 having one or more fan orifices 20 and one or more respective electrically driven, thermostatically controlled fans 22 housed over a radiator 24.

The type of shroud 18 can be for fan mounting, aerodynamic air-flow, or ornamental. A fan mounting shroud provides structure for the mounting placement and proper spacing of the one or more fans 22 from the radiator 24 and has one or more fan orifices 20 to obtain a more uniform air flow for removing heat from the radiator 24. A fan mounting shroud is typically used with all automotive radiator installations. An aerodynamic shroud has a surface design that ducts and directs the air flow across a moving vehicle to provide or assist the cooling air flow through the radiator 24. An ornamental shroud is used to cover the cooling system installation for aesthetic appearance and/or safety protection against inadvertent fan blade contact. The electrically driven, thermostatically controlled fans 22 may be electrically connected to one or more power sources of the vehicle 16 through wiring. Any of the shrouds 18 may be attached to a horizontal mounting frame 25, which is mounted to the rooftop 11 of the vehicle 16.

The configuration of the horizontal radiator units 12, and the number of fan orifices 20 and fans 22 may vary depending upon such factors as the configuration of the rooftop 11 of the vehicle 16, the size of the fans 22, and the cooling requirements of the vehicle engine. Although the one or more elongated radiator units 12 of the cooling system 10 are shown mounted perpendicular to the direction of vehicle travel, in an alternative preferred embodiment, the one or more elongated radiator units 12 of the cooling system 10 are mounted parallel to the direction of vehicle travel.

The radiators 24 may be interconnected by tubing 26. The tubing may interconnected to provide either complete flow or partial flow with bypass through each radiator. A partial flow with bypass is typically used in the art as a method for eliminating trapped air from within the liquid coolant tanks and passages. Each radiator 24 may have a conventional fill orifice 28 and pressure cap 30. The optional overflow tank 14 may have a conventional fill orifice 32 and cap 34. The overflow tank 14 may be connected to the fill orifice 28 of one of the radiators 24 through tank connecting tube 36.

Interconnecting tubing 35 covered by a secondary heat shield 37 may run down along a side 39 of the vehicle 16 for connecting the rooftop engine cooling system 10 to the one or more coolant passages of the vehicle engine in the engine compartment. In alternative embodiments, the interconnecting tubing 35 may run inside the vehicle 16, outside the vehicle 16, or a combination of inside and outside the vehicle 16. In the embodiment of the rooftop engine cooling system 10 where the system 10 is incorporated into a new vehicle, the interconnecting tubing 35 may also be incorporated into the vehicle design. One or more circulation pumps (not shown) may be used to pump coolant through the rooftop engine cooling system 10, the vehicle engine, and the interconnecting tubing.

In an alternative embodiment, an electric heater unit may be added to the system 10 to heat the coolant to a convenient working temperature under extreme cold weather conditions.

The one or more of the rooftop radiator units 12 may work in combination to cool the vehicle engine or the one or more radiator units 12 may be separate rooftop radiator units 12 that are separately used to cool separate vehicle components requiring cooling. For example, but not by way of limitation, a first rooftop radiator unit 12 may be used for cooling the vehicle engine, and a separate, second rooftop radiator unit 12 may be used to cool another vehicle component requiring cooling (e.g., a turbo charger intercooler, a high power electric motor drive, or an inverter-controller of a hybrid bus).

FIG. 2 is a top plan view of the rooftop engine cooling system 10. The two radiator units 12 are shown connected by the interconnecting tubing 26 and connected to the optional overflow tank 14 through tank connecting tube 36. Portions of the fan mounting shroud 18 are shown broken away to reveal the radiator 24. The radiator 24 may include a radiator intake tank 38, a radiator core 40 and a radiator exit tank 42. One or more fluid level floats (not shown) in one or more of the tanks may be used to indicate the coolant fluid level to the vehicle instrumentation system, including but not limited to, a gage located on a dashboard of the vehicle 16. Also shown are the plurality of fan orifices 20 and thermostatically controlled electric fans 22.

FIG. 3 shows that the radiator core 40 of the radiator 24 may include a plurality of fine radiator core tubes 44. A heat shield 46 may be located between the rooftop engine cooling system 10 and the rooftop 11 of the vehicle 16.

In FIG. 3, ambient air may flow into the side of the radiator unit 12 through air inlet(s) 48, underneath the radiator core 40, over the radiator core 40, and up and out of the fan orifice(s) 20 with the assistance of the fan 22.

The large surface area of the roof top 11 significantly reduces the fan power requirement by more than a factor of ten compared to a standard radiator in an engine compartment. Standard bus radiators/intercoolers consume up to 50 HP of engine power to drive the radiator cooling fan alone. The electrically driven radiator fans 22 consume less than 3 HP for equivalent cooling. The larger surface area of the roof top 11 causes the airspeed through the much larger horizontally mounted radiator units 12 to be reduced and the air pressure drop across the radiator units 12 to be reduced, increasing the cooling system efficiency. This results in decreasing the engine load by more than 20% (50 HP−3 HP=47 HP; assuming 185–280 HP at full power for a standard 40 ft. bus engine). In one preferred embodiment mounted on a model RTS NOVA bus, the standard fan consumed 40 to 50 HP while the horizontal rooftop cooling system required 1.5 HP at full fan power. This approximately 30 times power reduction demonstrates the significant benefits of the horizontal rooftop cooling system.

The horizontal rooftop engine cooling system 10 also allows for natural convectional air current to rise through the radiator units 12 and allows ambient air to easily flow into and through the cooling system 10, minimizing the power burden of the fans 22. Natural convection currents of the heated cooling fluid may also assist the circulation pump(s) in conveying the coolant through the rooftop engine cooling system 10. With the radiator units 12 unconfined on the rooftop 11 of the vehicle 16, and with less demanding size limitations, the heat may be dissipated in a natural upward direction, minimizing the use of the electrically driven, thermostatically controlled fans 22. Consequently, the load of the electrically driven, thermostatically controlled fans 22 is far less than that of fans of a standard radiator located in the engine compartment of a vehicle. This greatly improves the efficiency of the vehicle 16.

In addition to reducing the load on the engine and/or power sources of the vehicle 16, moving the cooling system 10 from the engine compartment to the rooftop 11 of the vehicle improves the airflow of ambient air into the engine compartment and over the engine, and makes the engine compartment more accessible, reducing maintenance and repair time.

A further benefit of locating the cooling system 10 on the rooftop 11 of the vehicle 16 is that some of the cleanest and coolest air is available at the altitude of the rooftop 11, reducing the number of times the radiator needs to be serviced and increasing the duration between radiator cleanings. Because radiator cleaning requirements stipulate that the radiator be cleaned in the opposite direction of the airflow, the cooling system 10 can be cleaned by simply spraying water through the fan orifices 20 and fans 22 of the ornamental shroud 18 from outside of the cooling system 10 such as may occur during a normal bus wash cycle. This is much simpler and less time-consuming than cleaning a radiator from the inside of the engine compartment, which may require partial disassembly of the radiator shroud to effectively clean the radiator.

The vehicle rooftop engine cooling system 10 shown in the drawings and described in detail herein disclose arrangements of elements of particular construction and configuration for illustrating preferred and alternate embodiments of structure and method of operation of the present invention. It is to be understood, however, that elements of different construction and configuration and other arrangements thereof, other than those illustrated and described may be employed for providing a rooftop engine cooling system 10 in accordance with the spirit of this invention, and such changes, alternations and modifications as would occur to those skilled in the art are considered to be within the scope of this invention as broadly defined in the appended claims.

What is claimed is:

1. A method of using an engine cooling system with a bus including a rooftop and an engine in an engine compartment for propelling the bus, the engine including one or more passages for allowing coolant to flow there through for cooling the engine, the method comprising:

providing a horizontal rooftop engine cooling system including an electrical heater unit and one or more radiator units having a horizontally mounted radiator through which coolant fluid flows for removing heat from the radiator, one or more fans disposed above the radiator to assist in removing heat from the radiator;

horizontally locating the rooftop engine cooling system on the rooftop of the bus and the electrical heater unit located outside the engine compartment;

interconnecting the one or more radiator units of the rooftop engine cooling system to the one or more passages of the engine to allow coolant to flow between the engine and the rooftop cooling system to cool the engine;

pulling air from the radiator with the one or more fans in the same direction as the natural convection of the radiator to assist natural convection; and electrically heating coolant in the rooftop engine cooling system with the electrical heater unit.

2. The method of claim 1, wherein the rooftop engine cooling system includes an overflow tank interconnected to the one or more radiator units and located on the rooftop of the bus.

3. The method of claim 1, wherein the one or more fans include one or more electrically driven, temperature-controlled fans, and the method further includes controlling the fans based on temperature.

4. The method of claim 1, wherein the rooftop engine cooling system is incorporated into the bus during the manufacture of the bus.

5. The method of claim 1, wherein the rooftop engine cooling system is retrofitted onto an existing bus.

6. The method of claim 1, wherein the one or more radiator units include multiple separate radiator units, and the method further includes separately cooling separate respective components with the separate radiator units.

7. The method of claim 1, wherein the one or more radiator units are longitudinally oriented with respect to the bus.

8. The method of claim 1, wherein the rooftop engine cooling system includes one or more fan apertures with one or more respective fans to further assist in removing heat from the radiator, and method further includes cleaning the rooftop engine cooling system by introducing water into the rooftop engine cooling system through the one or more fan apertures.

* * * * *